Patented Mar. 12, 1935

1,993,771

UNITED STATES PATENT OFFICE 1,993,771

PRESERVING AGENTS FOR ANIMAL AND VEGETABLE FATS, FATTY OILS, AND SOAP

William S. Calcott and William A. Douglass, Pennsgrove, N. J., and Herbert W. Walker, Wilmington, Del., assignors to E. I. du Pont de Nemours & Company, Wilmington, Del., a corporation of Delaware No Drawing. Application September 10, 1929, Serial No. 391,706

10 Claims. (Cl. 87—9)

This invention relates to the treatment of auto-oxidizable esters and inorganic salts of fatty acids with members of a class of organic compounds to retard the deterioration of and development of rancidity in these substances. More particularly it pertains to the addition of hydroxy diaryl compounds to animal and vegetable fats and fatty oils and soap to stabilize these materials and to delay rancidification. By the term "auto-oxidizable" is meant the capacity for spontaneous chemical combination with oxygen of the atmosphere under ordinary conditions.

Butter, lard, cocoanut oil and other animal and vegetable and fatty oils, together with soap, the sodium or potassium salt of the fatty acids contained in these fats and fatty oils, undergo decomposition and develop an objectionable rancid odor and taste on exposure to the air under ordinary conditions. This deterioration is due to the oxidation of the fatty acid part of the fat or soap molecule by atmospheric oxygen. The oxide derivatives which are first formed become decomposed or altered with the production as end products of substances having a rancid smell and taste.

Some improvements in the keeping quality of these auto-oxidizable substances are disclosed in U. S. P. 1,542,438 by Divine, which refers to the use of diphenylamine in soap derived from cotton seed oil foots, in U. S. P. 1,672,657 by Powell, disclosing the use of the condensation product of an aromatic amine and an aliphatic aldehyde in raw fats prior and preparatory to saponification, in U. S. P. 1,575,529 by Bollman covering the use of soya bean lecithin in edible oils, in B. P. 181,365 by Moureu and du Fraisse who employ the the phenols such as pyrogallol, guaiacol and hydroquinone as stabilizers for auto-oxidizable substances, particularly the vegetable oils such as linseed and nut oil, in B. P. 208,189 by Lever Brothers, disclosing the use of phenols of the hydroquinone, guaiacol and resorcinol type in whale oil to prevent deterioration, in D. R. P. 308,408 by Boehringer, who has covered the use of alkali lactates as stabilizers for margarine, butter and the like, and in D. R. P. 254,303 by Rechburg, Braun and Oetermann who have found sulfur and pyrogallol to be effective for preserving oils and fats.

This invention has as an object the prevention or retardation of the development of rancidity in fats and fatty oils and soap by the introduction of certain organic compounds which will prevent or retard the chemical combination of fats, fatty oils and soap with atmospheric oxygen, thereby causing them to retain their sweetness and properties unaltered over an extended period of time during which they would otherwise deteriorate and become unfit for or objectionable to use.

These objects are accomplished by the invention herein described which pertains to incorporating into auto-oxidizable esters and inorganic salts of fatty acids, such as the animal and vegetable fats and fatty oils and the like and soap, members of the hydroxy diaryl class of organic compounds which act as antioxidants and prevent or retard decomposition and rancidification. The general formula of this hydroxy diaryl class of compounds which we employ for improving the keeping quality of fats, fatty oils and soap is:

HO—R—R'—Y, in which R and R' are aryl nuclei which may be alike or different, and Y is hydrogen or hydroxyl.

By the use of such antioxidizing agents the auto-oxidation of substances which tend to become rancid is prevented or effectively retarded in such a way that they remain sweet and apparently unchanged for considerably longer periods of time. As illustrative of the hydroxyl diaryl group of compounds which we have used and found to be effective are:

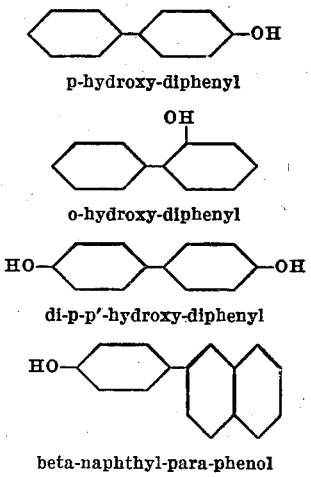

p-hydroxy-diphenyl o-hydroxy-diphenyl di-p-p'-hydroxy-diphenyl beta-naphthyl-para-phenol By way of illustrating our invention the following examples are given:

*Example 1*

Oxygen absorption measurements were made on a sample of ordinary commercial lard and on a lard sample containing 0.1% dihydroxy diphenyl, which had been thoroughly incorporated, in an air atmosphere of 80% relative humidity at 45° C. The lard samples were supported on inert silica pellets to give increased exposure of the fat to oxidation and the rate and extent of oxidation measured quantitatively. Taking 0.05% by weight oxygen absorbed as the point where lard becomes rancid, the untreated samples became rancid in 10 hours, while the sample containing p-hydroxy-diphenyl was observed to remain 62 hours before beginning to absorb oxygen to the extent that rancidification occurred. The lard sample treated with the hydroxy diaryl compound remained sweet over six times as long as untreated lard under otherwise identical conditions.

*Example 2*

Lard treated with 0.1% di-p-p'-hydroxy-diphenyl and run as in Example 1 was observed to remain stable and to absorb less than 0.05% oxygen by weight in 150 hours. Deterioration was considerably delayed in this case. The antioxidant afforded good protection against oxidation and attendant rancidity.

Para-beta-naphthyl phenol and o-hydroxy diphenyl were found to contribute a very decided improvement to the stability of lard and were very effective in postponing the development of rancidity. Very similar results have been obtained with butter, cocoanut oil and white olive castile soap using these antioxidants.

*Example 3*

Cocoanut oil treated with 0.1% p-b-naphthyl phenol and run as in Example 1 was found to remain stable over eight times as long as untreated cocoanut oil. The untreated control sample required 18 hours at 45° in an oxygen atmosphere to absorb 2% by weight of oxygen, while in the presence of 0.1% p-b-naphthyl phenol 151 hours elapsed before the same quantity of oxygen was absorbed.

*Example 4*

White olive castile soap treated with 0.1% p-hydroxy diphenyl required over 160 hours in an oxygen atmosphere at 60° C. to absorb 2% by weight of oxygen, whereas an untreated control sample absorbed 2% oxygen in 30 hours. An inhibition of oxidation was secured by the use of p-hydroxy diphenyl in the soap resulting in a marked improvement in the aging qualities of the soap which otherwise would have shown considerable deterioration and the development of rancidity.

In addition to being very good inhibitors of deterioration and the development of rancidity, this class of compounds is light-stable and gives rise to substantially no discoloration of white or light colored fat and soap stocks. Normally, considerable discoloration results by exposing fats, and soaps containing, for example, diphenylamine to the action of sunlight or ultraviolet light.

It will be understood that we do not wish to be limited to the use of 0.1% by weight of these antioxidant agents; larger and lesser amounts may be used advantageously—that is, the concentration may vary from 0.001% to 1.0% and above, and protection against deterioration to a less and greater degree will be afforded.

Other compounds which are members of the class described in the specification and which are effective as fat and soap antioxidants are:

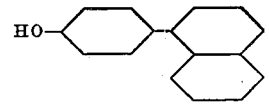

p-alpha-naphthyl-phenol

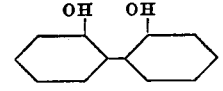

2:2'-dihydroxy-diphenyl

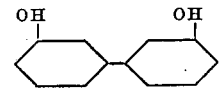

3:3'-dihydroxy-diphenyl

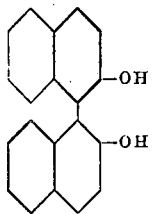

2:2'-dihydroxy-1:1'-dinaphthyl

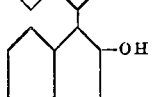

3:3'-dihydroxy-2:2'-dinaphthyl

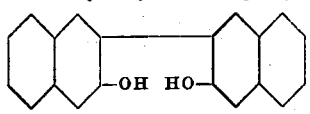

1:1'-dihydroxy-2:2'-dinaphthyl

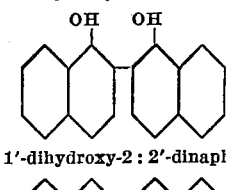

4:4'-dihydroxy-2:2'-dinaphthyl

In the type formula given above, covering the compounds of our invention, either R or R' or both may be a diphenyl nucleus, thus giving a large number of compounds which are effective for our purpose. Among these for example are such compounds as the following

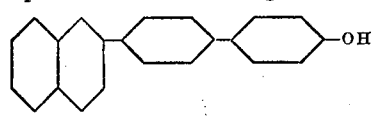

p-hydroxy-di-phenyl-p'-beta-naphthalene

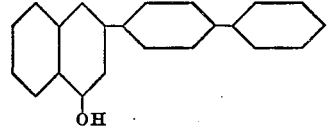

2-diphenyl-4-hydroxy-naphthalene

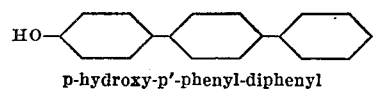

p-hydroxy-p'-phenyl-diphenyl

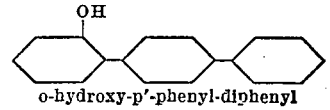

o-hydroxy-p'-phenyl-diphenyl

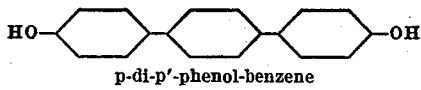

p-di-p'-phenol-benzene

Although we have disclosed only aryl groups and mono-hydroxy substituted aryl groups, it will be understood that substances containing a plurality of hydroxyl substituents or alkyl or aralkyl substituents fall within the contemplation of our invention. The substituents must of course be of such nature as not to neutralize the hydroxyl groups or nullify the inhibiting effect of the main nucleus.

As many apparent and widely different embodiments of this invention may be made without departing from the spirit thereof, it is to be understood that we do not limit ourselves to the foregoing examples or description except as indicated in the following claims:

We claim:

1. A composition of matter comprising a member of the group consisting of fats, fatty oils, fatty esters, fatty acid salts, soap stock and soap, and di-p:p'-hydroxy-diphenyl as an oxidation inhibitor.

2. A composition of matter comprising soap and di-p:p'-hydroxy-diphenyl as an oxidation inhibitor.

3. A composition of matter comprising an animal fat and di-p:p'-hydroxy-diphenyl as an oxidation inhibitor.

4. A composition of matter comprising a vegetable oil and di-p:p'-hydroxy-diphenyl as an oxidation inhibitor.

5. In the process of making soap the step which comprises adding a fraction of a percent of di-p:p'-hydroxy-diphenyl to the soap stock.

6. The art of retarding rancidification of a member of the group consisting of fats, fatty oils, fatty esters, soap stock, fatty acid salts and soap, which comprises the step of incorporating di-para-para'-hydroxy-diphenyl therein.

7. A composition of matter consisting of a member of the group consisting of fats, fatty oils, fatty esters, fatty acid salts, soap stock and soap, and di-p:p'-hydroxy-diphenyl as an oxidation inhibitor.

8. A composition of matter consisting of soap and di-p:p'-hydroxy-diphenyl as an oxidation inhibitor.

9. A composition of matter comprising a member of the group consisting of fats, fatty oils, fatty esters, soap stock, fatty acid salts and soap, having incorporated therein 0.001 to 1.0% of a di-para-para'-hydroxy-diphenyl.

10. A composition of matter consisting of a member of the group consisting of fats, fatty oils, fatty esters, soap stock, fatty acid salts and soap, having incorporated therein 0.001 to 1.0% of a di-para-para'-hydroxy-diphenyl.

WILLIAM S. CALCOTT.
WILLIAM A. DOUGLASS.
HERBERT W. WALKER.